(12) United States Patent
Kim

(10) Patent No.: US 10,996,429 B2
(45) Date of Patent: May 4, 2021

(54) IMAGING LENS AND CAMERA MODULE HAVING SAME

(71) Applicant: LG INNOTEK CO., LTD., Seoul (KR)

(72) Inventor: Kyung Tae Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 254 days.

(21) Appl. No.: 15/555,418

(22) PCT Filed: Mar. 3, 2016

(86) PCT No.: PCT/KR2016/002118
§ 371 (c)(1),
(2) Date: Sep. 1, 2017

(87) PCT Pub. No.: WO2016/140526
PCT Pub. Date: Sep. 9, 2016

(65) Prior Publication Data
US 2018/0039043 A1 Feb. 8, 2018

(30) Foreign Application Priority Data

Mar. 4, 2015 (KR) .................. 10-2015-0030146
Nov. 19, 2015 (KR) .................. 10-2015-0162384

(51) Int. Cl.
*G02B 9/58* (2006.01)
*G02B 13/06* (2006.01)
(Continued)

(52) U.S. Cl.
CPC ............... *G02B 9/58* (2013.01); *G02B 13/06* (2013.01); *G03B 17/02* (2013.01); *H04N 5/225* (2013.01); *G02B 13/18* (2013.01)

(58) Field of Classification Search
CPC . G02B 1/00; G02B 1/04; G02B 1/041; G02B 5/005; G02B 5/20; G02B 5/208;
(Continued)

(56) References Cited

U.S. PATENT DOCUMENTS

| 4,015,987 A | 4/1977 | Konoma et al. |
| 6,072,634 A * | 6/2000 | Broome ................. G02B 5/005 |
| | | 359/627 |

(Continued)

FOREIGN PATENT DOCUMENTS

| JP | 2007-264676 A | 10/2007 |
| KR | 10-2004-0110272 A | 12/2004 |

(Continued)

OTHER PUBLICATIONS https://www.oharacorp.conn/pdf/all.pdf, Ohara Apr. 2017.*
International Search Report in International Application No. PCT/KR2016/002118, filed Mar. 3, 2016.

*Primary Examiner* — James C. Jones
(74) *Attorney, Agent, or Firm* — Saliwanchik, Lloyd & Eisenschenk

(57) ABSTRACT

An embodiment provides an imaging lens comprising first to fourth lenses that are sequentially arranged from an object side towards an image side and satisfying mathematical formula 1, wherein the first lens has negative refractive power, the second lens and the third lens have positive refractive power, and the fourth lens has negative refractive power. $-40.0<R1+R2<-20.0$ where R1 is the curvature radius of the object side surface of the first lens, and R2 is the curvature radius of the image side surface of the first lens.

21 Claims, 9 Drawing Sheets

(51) Int. Cl.
*G03B 17/02* (2021.01)
*H04N 5/225* (2006.01)
*G02B 13/18* (2006.01)

(58) Field of Classification Search
CPC . G02B 7/00; G02B 7/02; G02B 7/021; G02B 7/022; G02B 7/028; G02B 9/00; G02B 9/34; G02B 9/58; G02B 13/00; G02B 13/001; G02B 13/0015; G02B 13/002; G02B 13/004; G02B 13/06; G02B 13/18; G02B 27/0025; G03B 17/00; G03B 17/02; G03B 17/12; H04N 5/00; H04N 5/222; H04N 5/225; H04N 5/2253; H04N 5/2254; H04N 5/2257
USPC ....... 359/642, 738, 739, 740, 754, 771, 781, 359/782, 811, 819, 827
See application file for complete search history.

(56) References Cited

U.S. PATENT DOCUMENTS

| | | | |
|---|---|---|---|
| 2004/0257671 A1* | 12/2004 | Kim | G02B 13/18 359/680 |
| 2014/0098432 A1* | 4/2014 | Kubota | G02B 13/004 359/781 |
| 2016/0116710 A1* | 4/2016 | Liang | G02B 13/004 359/715 |

FOREIGN PATENT DOCUMENTS

| | | |
|---|---|---|
| KR | 10-2005-0047324 A | 5/2005 |
| KR | 10-2007-0034137 A | 3/2007 |
| KR | 10-2014-0003129 A | 1/2014 |
| KR | 10-2014-0056494 A | 5/2014 |
| KR | 10-1429892 B1 | 8/2014 |
| KR | 10-2014-0126365 A | 10/2014 |

* cited by examiner

IMAGING LENS AND CAMERA MODULE HAVING SAME

CROSS-REFERENCE TO RELATED APPLICATIONS

This application is the U.S. national stage application of International Patent Application No. PCT/KR2016/002118, filed Mar. 3, 2016, which claims priority to Korean Application Nos. 10-2015-0030146, filed Mar. 4, 2015, and 10-2015-0162384, filed Nov. 19, 2015, the disclosures of each of which are incorporated herein by reference in their entirety.

TECHNICAL FIELD

Embodiments relate to an imaging lens and a camera module having the same.

BACKGROUND ART

In general, an optical system employed in a vehicle camera or a surveillance camera requires a wide-angle lens having a wide horizontal viewing angle of at least a certain angle in order to image a wide range of views including a front view, a side view, and a rear view. Further, a compact and lightweight design is required for lenses employed in the optical system In this trend, miniaturization of light receiving elements such as a Charge Coupled Device (CCD) mounted on a miniaturized imaging device is progressing, but the imaging lens still occupies the largest space in the imaging device.

Therefore, the imaging lens, which forms an image of an object, at the center of the issue of compact and thin design among other elements of the imaging device.

Here, realizing a small imaging lens is not the only issue. With enhancement in performance of the light receiving element, the imaging lenses are also required to exhibit high performance. However, the compact design of the imaging lens necessarily results in a close distance to the light receiving element, which causes light to be obliquely incident on the imaging surface of the imaging device. Thereby, the condensing performance of the imaging lens is not sufficiently exhibited, and brightness of the image may drastically change from the central portion of the image to the peripheral portion of the image.

In implementing an optical system having a wide angle of view, the optical system will elongated along the optical axis, and the diameter of the lens should be increased in order to secure a certain amount of ambient light, which obstructs a compact design of the optical system.

DISCLOSURE

Technical Problem

Embodiments provide an imaging lens which has high performance and a ultra-thin size and protects the surface thereof from surface scratches or contamination caused by foreign matter.

Technical Solution

In one embodiment, an imaging lens includes a first lens to a fourth lens sequentially arranged from an object side to an image side, wherein the first lens has a negative refractive power, the second lens and the third lens have a positive refractive power, and the fourth lens has a negative refractive power, the imaging lens satisfying Equation 1.

$$-40.0 < R1+R2 < -20.0, \qquad \text{<Equation 1>}$$

where R1 is a radius of curvature of an object surface of the first lens, and R2 is a radius of curvature of an image surface of the first lens.

For example, the third lens may have a refractive index greater than 1.57 and less than 1.60.

For example, an Abbe number of the third lens is greater than 60 and less than 64.

For example, the object surface of the third lens may have a conic constant greater than −0.10 and less than 0.21, wherein an image surface of the third lens may have a conic constant greater than −1.4 and less than −0.7.

For example, the imaging lens may further include an aperture stop disposed between the second lens and the third lens.

For example, at least one of the first lens to the fourth lens is formed of glass.

For example, the third lens may have a refractive index greater than 1.61 and less than 1.63.

For example, the third lens may have an Abbe number greater than 57 and less than 63.

For example, the fourth lens may have a refractive index greater than 1.63 and less than 1.65.

For example, the fourth lens may have an Abbe number greater than 20 and less than 24.

For example, the first lens may be concave to the object side, and at least one of an object surface of the first lens and an image surface of the first lens may be an aspherical surface.

For example, the second lens may be convex to the object side, and at least one of an object surface of the second lens and an image surface of the second lens may be an aspherical surface.

For example, the third lens may be convex to the object side and the image side.

For example, the fourth lens may be concave to the object side and the image side, and at least one of an object surface of the fourth lens and an image surface of the fourth lens may be an aspherical surface.

In another embodiment, an imaging lens includes a first lens to a fourth lens sequentially arranged from an object side to an image side, wherein the first lens may have a concave object surface and may have a negative refractive power, the second lens may have a positive refractive power, the third lens is formed of glass and may have a positive refractive power, and The fourth lens is made of plastic, may have a negative refractive power, and a gap maintaining member disposed between neighboring lenses of the lenses to maintain a gap between neighboring lenses, wherein the gap maintaining member includes a coupling surface including a flat surface, the coupling surface being coupled to an object surface and an image surface of the neighboring lenses.

For example, an inner circumferential surface of the gap maintaining member may be provided with a diffused reflection preventing portion including a concave/convex portion.

For example, the object surface and/or the image surface of each of the first lens to the fourth lens may include at least one contact surface to be coupled to the coupling surface of the gap maintaining member, at least one part of the contact surface being a flat surface.

For example, a gap between the second lens and the third lens may be the largest among gaps between the neighboring lenses.

For example, a diameter of the first lens may be greater than a diameter of the second lens, and the diameter of the second lens may be greater than a diameter of the third lens.

In another embodiment, a camera module includes an imaging lens including a first lens to a fourth lens sequentially arranged from an object side to an image side, wherein the first lens may have a negative refractive power, the second lens and the third lens have a positive refractive power, and the fourth lens may have a negative refractive power, a filter allowing light passed through the imaging lens to be selectively transmitted therethrough according to a wavelength, and a light receiving element configured to receive the light transmitted through the filter.

Advantageous Effects

An imaging lens according to embodiments may provide a wide angle of view even with four lenses, implement a low-distortion image and prevent scratches on the surface of the lenses and contamination by foreign matter.

BEST MODE

Hereinafter, embodiments capable of realizing the above objects will be described with reference to the accompanying drawings.

In the description of the embodiments, the term "object surface" refers to a surface of a lens facing the object side with respect to an optical axis, and the term "image surface" refers to a surface of the lens facing the image side.

Further, in the description, "+ power" of the lens represents a converging lens for converging parallel light, and "−power" of the lens represents a diverging lens for diverging parallel light.

Figure 1:
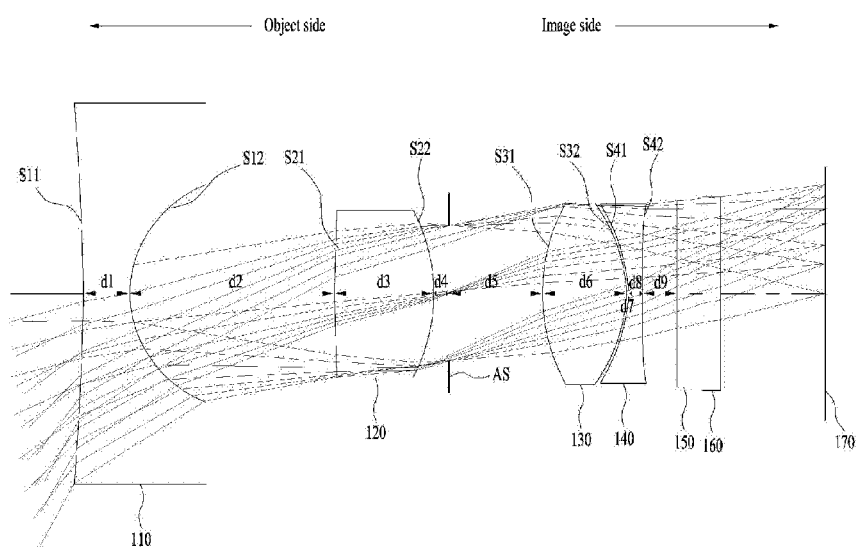
FIG. 1 illustrates a first embodiment of an imaging lens.
Figure 2:
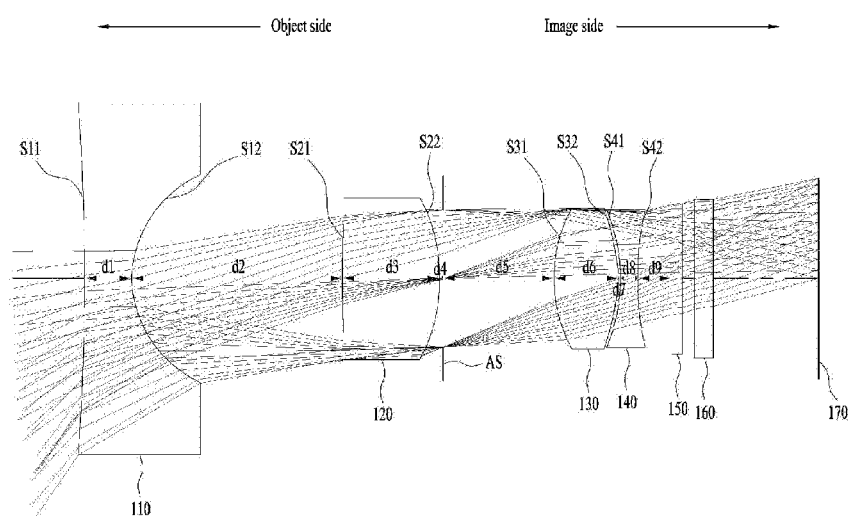
FIG. 2 illustrates a second embodiment of the imaging lens.
Figure 3:
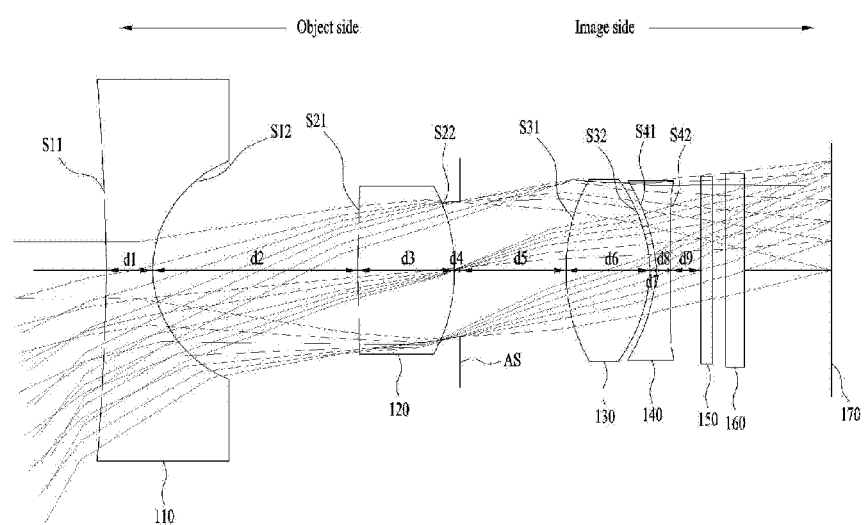
FIG. 3 illustrates a third embodiment of the imaging lens.

FIG. 1 illustrates a first embodiment of an imaging lens, FIG. 2 illustrates a second embodiment of the imaging lens, and FIG. 3 illustrates a third embodiment of the imaging lens.

Referring to FIGS. 1 to 3, the first to third embodiments of the imaging lens include a first lens 110, a second lens 120, a third lens 130 and a fourth lens 140, arranged in this order from the object side to the image side.

A shutter may be provided on the front surface of the first lens 110 and an aperture stop (AS) may be disposed between the second lens 120 and the third lens 130. The AS may be a variable aperture.

Further, a filter 150, a cover glass 160, and a light receiving element 170 may be provided in order, thereby forming an imaging lens in a camera module.

Here, the filter 150 may be a plate-shaped optical member such as an infrared ray filter, and the cover glass 160 may be an optical member, for example, a cover glass for protecting the imaging surface. The light receiving element 170 may be an image sensor stacked on a printed circuit board (not shown).

The above-described embodiment and the following embodiments may provide an imaging lens applicable to a camera module having pixels and/or a large number of pixels, and the camera module may include an image sensor or a light receiving element having pixels and/or a large number of pixels.

In FIGS. 1 to 3, 'S11' is the object surface of the first lens 110, 'S12' is the image surface of the first lens 110, 'S21' is the object surface of the second lens 120, 'S22' is the image surface of the second lens 120, 'S31' is the object surface of the third lens 130, 'S32' is the image surface of the third lens 130, 'S41' is the object surface of the fourth lens 140, 'S42' is the image surface of the fourth lens 140.

In the embodiments, the first lens 110 may have a concave surface as the object surface S11 and a flat or concave surface as the image surface S12, and have a negative refractive power. The second lens 120 may have a convex surface as the object surface S21 and a flat or convex surface as the image surface S22 and have a positive refractive power. The third lens 130 may have convex surfaces as both the object surface S31 and the image surface S32 and have a positive refractive power. The fourth lens 140 may have concave surfaces as both the object surface S41 and the image surface S42 and have a negative refractive power.

The third lens 130 and the fourth lens 140 are spaced apart from each other by a predetermined distance. To minimize the air gap between the third lens 130 and the fourth lens 140, the image surface S32 of the third lens 130, which is convex, and the object surface S41 of the fourth lens 140, which is concave, may be disposed at a distance of 40 μm to 60 μm from each other.

This arrangement of the third lens 130 and the fourth lens 140 may improve the low dispersion performance and minimize the aberration.

At least one surface of the first to fourth lenses 110 to 140 may be aspherical. When at least one surface of the lenses is formed as an aspherical surface, the lenses may be excellent in correcting various aberrations, for example, spherical aberration, coma aberration and distortion.

At least one of the first to fourth lenses 110 to 140 may be formed of glass. Since the glass lens has a relatively high transition point, deformation of the refractive index and the focal length of the lens may be minimized despite that the lens undergoes sequential change according to change in temperature.

In the embodiments, the third lens 130, on which light transmitted through the aperture stop (AS), may be formed of glass since it is affected by heat most.

All of the first to fourth lenses 110 to 140 may be formed of glass. However, if all the lenses are made only of glass, the manufacturing cost of the imaging lens may be increased. As described above, forming the third lens glass and the other lenses of a plastic material may minimize thermal influence on the imaging lens, while greatly reducing the manufacturing cost of the imaging lens.

Coating may be applied onto the surfaces of the lenses according to the embodiments to prevent reflection or improve surface hardness.

The first to third embodiments may satisfy Equation 1 below.

$$-40.0 < R1 + R2 < -20.0 \quad \text{Equation 1}$$

Here, R1 denotes the radius of curvature of the object surface of the first lens, and R2 denotes the radius of curvature of the image surface of the first lens.

In the embodiment, in order to implement a wide angle lens, the object surface of the first lens may be formed in a concave shape to collect light. In addition, to provide a negative refractive power to the first lens, the image surface of the first lens may be formed in a concave shape.

Here, if the value of R1+R2 is less than −40.0 or greater than −20.0, light transmitted through the first lens cannot be incident on the second lens, and a wide angle of view of the imaging lens may not be secured.

The refractive index of the third lens 130 may be greater than 1.57 and less than 1.60. Here, if the refractive index of the third lens 130 is less than 1.57, the entire length of the imaging lens may be increased, the thickness of the third lens may be increased, and the resolution of the imaging lens may deteriorate. In addition, if the refractive index of the third lens 130 is greater than 1.60, it may be difficult to manufacture the third lens.

The Abbe number of the third lens 130 may be greater than 60 and less than 64. The Abbe number of the third lens 130 greater than 60 and less than 64 may be effective in improving the imaging lens regarding the chromatic aberration. Here, if the Abbe number of the third lens 130 is less than 60 or greater than 64, it may be difficult to manufacture the third lens.

The conic constant of the object surface S31 of the third lens 130 may be greater than −0.10 and less than 0.21 and the conic constant of the image surface S32 of the third lens 130 may be greater than −1.4 and less than −0.7. Here, if the conic constants of the object surface S31 and the image surface S32 of the third lens 130 are out of the aforementioned ranges, the resolution may be lowered.

Table 1 shows the radius of curvature, thickness or distance, refractive index, and Abbe number of each lens in the first embodiment of the imaging lens.

TABLE 1

| Surface number | Radius of curvature (R) | Thickness or distance (d) | Refractive index (Nd) | Abbe number (Vd) |
|---|---|---|---|---|
| S11 | −36.1944 | 1.319 | 1.5311 | 56.5 |
| S12 | 2.965159 | 5.800651 | | |
| S21 | 16.36467 | 2.8 | 1.5311 | 56.5 |

TABLE 1-continued

| Surface number | Radius of curvature (R) | Thickness or distance (d) | Refractive index (Nd) | Abbe number (Vd) |
|---|---|---|---|---|
| S22 | −6.05369 | 0.460194 | | |
| AS(stop) | 1.00E+18 | 2.633772 | | |
| S31 | 5.246022 | 2.399853 | 1.589 | 61.2 |
| S32 | −3.12816 | 0.05 | | |
| S41 | −3.1766 | 0.38 | 1.642 | 22.4 |
| S42 | −97.199 | 0.983529 | | |

In Table 1, the curvatures of the object surfaces and image surfaces of the first lens 110, the second lens 120, the AS, the third lens 130 and the fourth lens 140 are listed in order. A positive (+) curvature indicates curving to the object side and a negative (−) curvature indicates curving toward the light receiving element. The curvature of infinity indicates a flat surface. The table also shows the thickness corresponding to each object surface, and the distance to a lens and the like adjacent to the image surface.

In the first embodiment, the distance d4 between the image surface S22 of the second lens 120 and the aperture stop (AS) is 0.460194 mm, and the distance d5 between the AS and the object surface S31 of the third lens 130 is 2.633772 mm. d5 may be set to be greater than d4. That is, the second lens 120 may be disposed closer to the AS than the third lens 130 is. This structure is designed such that the third lens 130 is less affected by heat, and a low-distortion image may be acquired by the imaging lens according to the embodiment.

To minimize the aberration with improved low dispersion performance and maintain a certain distance between the third lens 130 and the fourth lens 140 by minimizing the air gap between the third lens 130 and the fourth lens 140, the image surface S32 of the third lens 130 and the object surface S41 of the fourth lens 140 may be arranged spaced apart from each other by a distance of 0.05 mm.

In the first embodiment, the refractive power of the first lens 110 is −0.197, the refractive power of the second lens 120 is 0.115, the refractive power of the third lens 130 is 0.270, and the refractive power of the fourth lens 140 is −0.197.

The focal length of the first lens 110 is −5.079, the focal length of the second lens 120 is 8.662, the focal length of the third lens 130 is 3.709, and the focal length of the fourth lens 140 is −5.070. Here, a positive (+) focal length indicates a real focus, and a negative (−) focal length indicates a virtual focus. This rule is the same for other embodiments described later.

The total focal length of the imaging lens according to the first embodiment is 3.1730 mm.

Although not shown, coating may be applied to the surfaces of each lens to prevent reflection or improve surface hardness.

Table 2 shows the conic constant k and aspherical coefficients A to D of each lens surface in the first embodiment.

TABLE 2

| Surface number | K | A | B | C | D |
|---|---|---|---|---|---|
| S11 | −38.998765 | 0.212466E−03 | −.398223E−05 | 0.197458E−07 | −.706309E−11 |
| S12 | −0.493508 | 0.813849E−03 | 0.227856E−03 | −.203029E−04 | 0.235975E−05 |
| S21 | −40.792050 | −.126510E−02 | −.408383E−03 | 0.476455E−04 | −.445578E−05 |
| S22 | −0.225426 | −.192012E−02 | −.779158E−04 | 0.115687E−04 | −.126901E−05 |
| S31 | 0.049368 | −.179093E−03 | −.850038E−04 | 0.225443E−04 | −.405445E−05 |

TABLE 2-continued

| Surface number | K | A | B | C | D |
|---|---|---|---|---|---|
| S32 | −0.896940 | 0.276948E−02 | 0.397754E−03 | −.504850E−04 | 0.248296E−05 |
| S41 | −2.358592 | −.224844E−02 | 0.538172E−03 | −.279062E−04 | 0.100786E−05 |
| S42 | 10.000000 | 0.393568E−02 | −.251601E−03 | 0.596224E−04 | −.404504E−05 |

It may be seen that both surfaces of each of the first to fourth lenses 110 to 140 are formed as aspheric surfaces. If both surfaces of each of the first to fourth lenses 110 to 140 are formed as aspherical surfaces, the lenses may exhibit excellent performance in correcting various aberrations such as spherical aberration, coma aberration and distortion.

Figure 4:
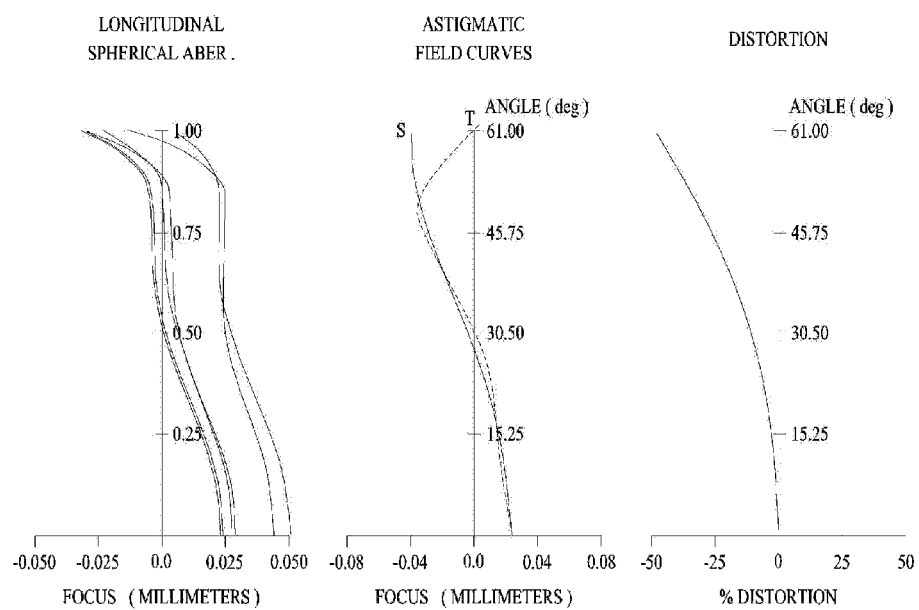
FIG. 4 is a graph depicting aberrations of the first embodiment of the imaging lens, which are longitudinal spherical aberration, astigmatic field curves, and distortion from left to right in the figure.

FIG. 4 is a graph depicting aberrations of the first embodiment of the imaging lens, which are longitudinal spherical aberration, astigmatic field curves, and distortion from left to right in the figure.

In FIG. 4, the Y axis represents the size of an image, the X axis represents the focal length (in mm) and the distortion degree (in %). The closer the curves approach the Y axis, the better the aberration correction function may be. In the graph of FIG. 4, the longitudinal spherical aberration is obtained for rays having wavelengths of 435.80 nm, 486.10 nm, 546.10 nm, 587.60 nm, 656.30 nm and 850.00 nm, and astigmatic field curves are astigmatic field curves on the sagittal surface (S) and a tangential surface (T) for light having a wavelength of 546.10 nm. Further, the distortion aberration represents distortion for light having a wavelength of 546.10 nm.

Table 3 below shows the radius of curvature, thickness or distance, refractive index and Abbe number of the second embodiment of the imaging lens.

TABLE 3

| Surface number | Radius of curvature (R) | Thickness or distance (d) | Refractive index (Nd) | Abbe number (Vd) |
|---|---|---|---|---|
| S11 | −36.1944 | 1.319 | 1.5311 | 56.5 |
| S12 | 2.965159 | 6.051559 | | |
| S21 | 16.36467 | 2.8 | 1.5311 | 56.5 |
| S22 | −6.05369 | 0.1 | | |
| AS(stop) | 1.00E+18 | 3.197186 | | |
| S31 | 4.472282 | 1.858068 | 1.589 | 61.2 |
| S32 | −4.12745 | 0.05 | | |
| S41 | −4.69987 | 0.5 | 1.642 | 22.4 |
| S42 | 14.53251 | 0.973202 | | |

In Table 3, the curvatures of the object surfaces and image surfaces of the first lens 110, the second lens 120, the AS, the third lens 130 and the fourth lens 140 are listed in order. A positive (+) curvature indicates curving to the object side and a negative (−) curvature indicates curving toward the light receiving element. The curvature of infinity indicates a flat surface. The table also shows the thickness corresponding to each object surface, and the distance to a lens and the like adjacent to the image surface.

In the second embodiment, the distance d4 between the image surface S22 of the second lens 120 and the aperture stop (AS) is 0.1 mm, and the distance d5 between the AS and the object surface S31 of the third lens 130 is 3.197186 mm. d5 may be set to be greater than d4. That is, the second lens 120 may be disposed closer to the AS than the third lens 130 is. This structure is designed such that the third lens 130 is less affected by heat, and a low-distortion image may be acquired by the imaging lens according to the embodiment.

To minimize the aberration with improved low dispersion performance and maintain a certain distance between the third lens 130 and the fourth lens 140 by minimizing the air gap between the third lens 130 and the fourth lens 140, the image surface S32 of the third lens 130 and the object surface S41 of the fourth lens 140 may be arranged spaced apart from each other by a distance of 0.05 mm.

In the second embodiment, the refractive power of the first lens 110 is −0.196, the refractive power of the second lens 120 is 0.115, the refractive power of the third lens 130 is 0.252, and the refractive power of the fourth lens 140 is −0.183.

The focal length of the first lens 110 is −5.101, the focal length of the second lens 120 is 8.697, the focal length of the third lens 130 is 3.961, and the focal length of the fourth lens 140 is −5.476.

The total focal length of the imaging lens according to the second embodiment is 3.1693 mm.

Although not shown, coating may be applied to the surfaces of each lens to prevent reflection or improve surface hardness.

Table 4 below shows the conic constant k and aspherical coefficients A to D of each lens surface in the second embodiment.

TABLE 4

| Surface number | K | A | B | C | D |
|---|---|---|---|---|---|
| S11 | −38.998765 | 0.212466E−03 | −.398223E−05 | 0.197458E−07 | −.706309E−11 |
| S12 | −0.493508 | 0.813849E−03 | 0.227856E−03 | −.203029E−04 | 0.235975E−05 |
| S21 | −40.792050 | −.126510E−02 | −.408383E−03 | 0.476455E−04 | −.445578E−05 |
| S22 | −0.225426 | −.192012E−02 | −.779158E−04 | 0.115687E−04 | −.126901E−05 |
| S31 | −0.017055 | −.424069E−04 | 0.193853E−05 | −.523047E−05 | 0.421021E−05 |
| S32 | −1.250524 | 0.216519E−02 | 0.254725E−03 | 0.116793E−04 | −.410740E−05 |
| S41 | −4.062207 | −.248634E−02 | 0.775096E−03 | −.382847E−04 | −.794010E−05 |
| S42 | −0.867839 | 0.311432E−02 | 0.403252E−03 | −.495979E−04 | 0.214033E−05 |

Figure 5:
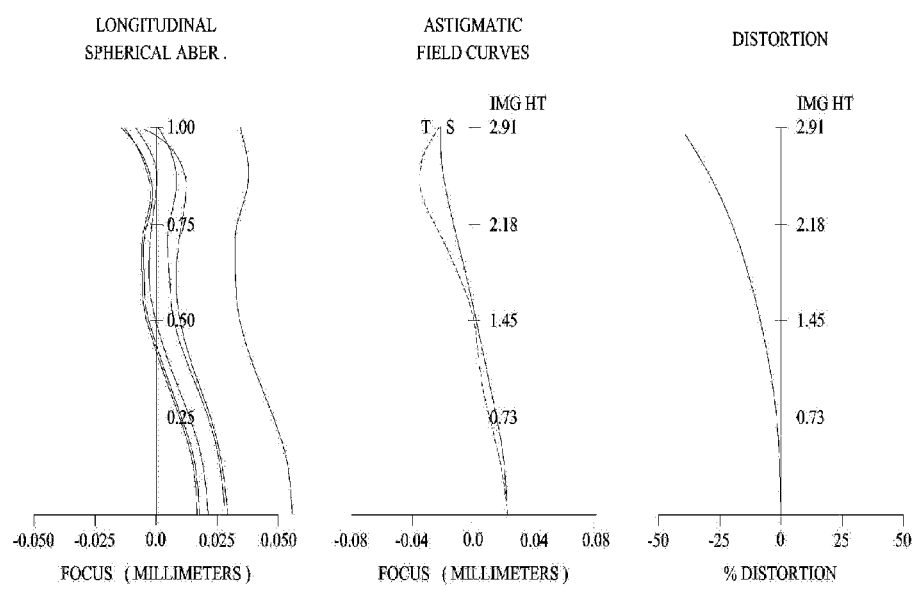
FIG. 5 is a graph depicting aberrations of the second embodiment of the imaging lens, which are longitudinal spherical aberration, astigmatic field curves, and distortion from left to right in the figure.

FIG. 5 is a graph depicting aberrations of the second embodiment of the imaging lens, which are longitudinal spherical aberration, astigmatic field curves, and distortion from left to right in the figure.

In FIG. 5, the Y axis represents the size of an image, the X axis represents the focal length (in mm) and the distortion degree (in %). The closer the curves approach the Y axis, the better the aberration correction function may be. In the graph of FIG. 5, the longitudinal spherical aberration is obtained for rays having wavelengths of 435.80 nm, 486.10 nm, 546.10 nm, 587.60 nm, 656.30 nm and 850.00 nm, and astigmatic field curves are astigmatic field curves on the sagittal surface (S) and a tangential surface (T) for light having a wavelength of 587.60 nm. Further, the distortion aberration represents distortion for light having a wavelength of 587.60 nm.

Table 5 shows the radius of curvature, thickness or distance, refractive index, and Abbe number of each lens in the third embodiment of the imaging lens.

TABLE 5

| Surface number | Radius of curvature (R) | Thickness or distance (d) | Refractive index (Nd) | Abbe number (Vd) |
|---|---|---|---|---|
| S11 | −36.1944 | 1.319 | 1.5311 | 56.5 |
| S12 | 2.965159 | 5.712527 | | |
| S21 | 16.36467 | 2.8 | 1.5311 | 56.5 |
| S22 | −6.05369 | 0 | | |
| AS(stop) | 1.00E+18 | 3.082622 | | |
| S31 | 4.860152 | 2.512555 | 1.589 | 61.2 |
| S32 | −3.39416 | 0.1 | | |
| S41 | −3.12216 | 0.464376 | 1.642 | 22.4 |
| S42 | −58.4582 | 0.879034 | | |

In Table 5, the curvatures of the object surfaces and image surfaces of the first lens 110, the second lens 120, the AS, the third lens 130 and the fourth lens 140 are listed in order. A positive (+) curvature indicates curving to the object side and a negative (−) curvature indicates curving toward the light receiving element. The curvature of infinity indicates a flat surface. The table also shows the thickness corresponding to each object surface, and the distance to a lens and the like adjacent to the image surface.

In the third embodiment, the distance d4 between the image surface S22 of the second lens 120 and the aperture stop (AS) is 0 mm, and the distance d5 between the AS and the object surface S31 of the third lens 130 is 3.082622 mm. In other words, the third lens 130 is disposed relatively far from the AS, and thus the third lens 130 may be less affected by heat. Thereby, a low-distortion image may be acquired.

To minimize the aberration with improved low dispersion performance and maintain a certain distance between the third lens 130 and the fourth lens 140 by minimizing the air gap between the third lens 130 and the fourth lens 140, the image surface S32 of the third lens 130 and the object surface S41 of the fourth lens 140 may be arranged spaced apart from each other by a distance of 0.01 mm. In addition, unlike the first and second embodiments, the distance between the image surface S32 of the third lens 130 and the object surface S41 of the fourth lens 140 in the third embodiment may be shorter, which may depend on the radiuses of curvature or the shapes of the third lens and the fourth lens.

In the third embodiment, the refractive power of the first lens 110 is −0.196, the refractive power of the second lens 120 is 0.115, the refractive power of the third lens 130 is 0.261, and the refractive power of the fourth lens 140 is −0.194.

The focal length of the first lens 110 is −5.101, the focal length of the second lens 120 is 8.697, the focal length of the third lens 130 is 3.825, and the focal length of the fourth lens 140 is −5.155.

The total focal length of the imaging lens according to the third embodiment is 3.1785 mm.

Although not shown, coating may be applied to the surfaces of each lens to prevent reflection or improve surface hardness.

Table 6 below shows the conic constant k and aspherical coefficients A to D of each lens surface in the third embodiment.

TABLE 6

| Surface number | K | A | B | C | D |
|---|---|---|---|---|---|
| S11 | −38.998765 | 0.212466E−03 | −.398223E−05 | 0.197458E−07 | −.706309E−11 |
| S12 | −0.493508 | 0.813849E−03 | 0.227856E−03 | −.203029E−04 | 0.235975E−05 |
| S21 | −40.792050 | −.126510E−02 | −.408383E−03 | 0.476455E−04 | −.445578E−05 |
| S22 | −0.225426 | −.192012E−02 | −.779158E−04 | 0.115687E−04 | −.126901E−05 |
| S31 | 0.202506 | −.402681E−03 | −.152561E−03 | 0.265831E−04 | −.286531E−05 |
| S32 | −0.757944 | 0.182120E−02 | 0.626393E−03 | −.568018E−04 | 0.180974E−05 |
| S41 | −3.096583 | −.206318E−02 | 0.526577E−03 | −.272536E−04 | 0.574780E−06 |
| S42 | −10.000000 | 0.870663E−02 | −.814185E−03 | 0.979174E−04 | −.452648E−05 |

Figure 6:
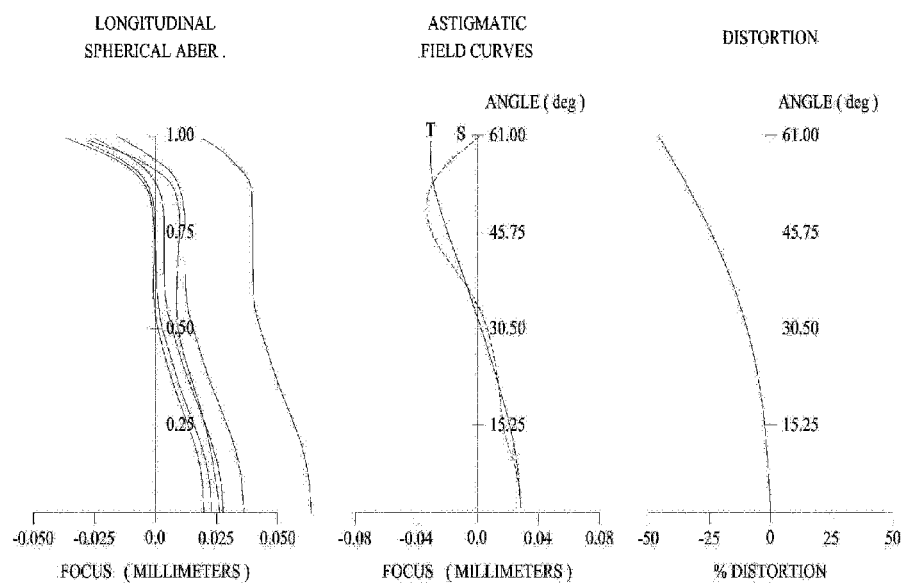
FIG. 6 is a graph depicting aberrations of the third embodiment of the imaging lens, which are longitudinal spherical aberration, astigmatic field curves, and distortion from left to right in the figure.

FIG. 6 is a graph depicting aberrations of the third embodiment of the imaging lens, which are longitudinal spherical aberration, astigmatic field curves, and distortion from left to right in the figure.

In FIG. 6, the Y axis represents the size of an image, the X axis represents the focal length (in mm) and the distortion degree (in %). The closer the curves approach the Y axis, the better the aberration correction function may be. In the graph of FIG. 6, the longitudinal spherical aberration is obtained for rays having wavelengths of 435.80 nm, 486.10 nm, 546.10 nm, 587.60 nm, 656.30 nm and 850.00 nm, and astigmatic field curves are astigmatic field curves on the sagittal surface (S) and a tangential surface (T) for light having a wavelength of 587.60 nm. Further, the distortion aberration represents distortion for light having a wavelength of 587.60 nm.

Figure 7:
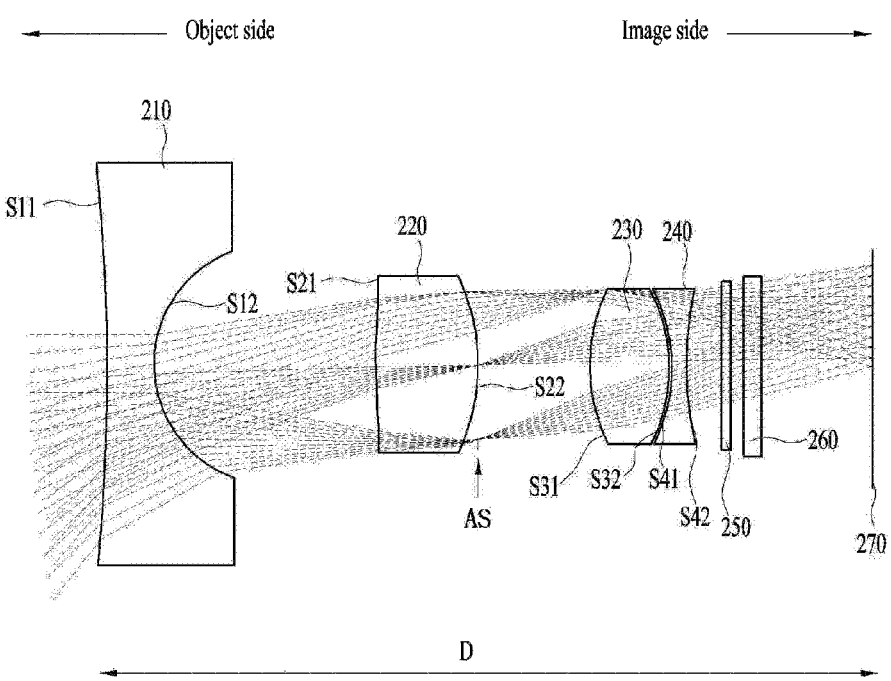
FIG. 7 illustrates a fourth embodiment of the imaging lens.

FIG. 7 illustrates a fourth embodiment of the imaging lens.

Referring to FIG. 7, the fourth embodiment of the imaging lens includes a first lens 210, a second lens 220, a third lens 230, and a fourth lens 240, which are sequentially arranged from the object side to the image side. An aperture stop (AS) may be arranged between the second lens 220 and the third lens 230. The fourth embodiment may also include a filter 250, a cover glass 260, and a light receiving element 270 which are sequentially arranged. Thereby, an imaging lens may be implemented in the camera module.

The light receiving element 270 may be an image sensor, and the width and height of the unit pixel of the image sensor may be less than or equal to 2 µm. The above-described embodiment and the following embodiments may provide an imaging lens applicable to a camera module having large pixels and/or a large number of pixels, and the above-described camera module may include an image sensor or a light receiving element having large pixels and/or a large number of pixels. In this case, the width and height of the unit pixel may be less than or equal to 4 µm, more specifically, may be less than or equal to 2 µm.

In FIG. 7, 'S11' is the object surface of the first lens 210, 'S12' is the image surface of the first lens 210, 'S21' is the object surface of the second lens 220, 'S22' is the image surface of the second lens 220, 'S31' is the object surface of the third lens 230, 'S32' is the image surface of the third lens 230, 'S41' is the object surface of the fourth lens 240, 'S42' is the image surface of the fourth lens 240.

'Sxy' described above may be similarly applied to another embodiment of the imaging lens described later.

The filter 250 may be a plate-shaped optical member such as an infrared ray filter, and the cover glass 260 may be an optical member, for example, a cover glass for protecting the imaging surface. The light receiving element 270 may be an image sensor stacked on a printed circuit board (not shown).

In this embodiment, regarding the first lens 210, the object surface S11 may have a concave shape, and the central area of the image surface S12 may be concave. At least one of the object surface S11 and the image surface S12 may be an aspherical surface.

For the second lens 220, the object surface S21 and the image surface S22 may be convex, and at least one of the object surface S21 and the image surface S22 may be an aspherical surface.

For the third lens 230, the object surface S31 and image surface S32 may be convex. For the fourth lens 240, the object surface S41 may have a concave shape and the image surface S42 may have a concave shape, and at least one of the object surface S41 and the image surface S42 may be an aspherical surface.

When the aspheric surface is formed on at least one surface of the lenses, the lenses may be excellent in correcting various aberrations such as spherical aberration, coma aberration, and distortion.

The object surfaces of the lenses have the following shapes. The object surface S11 of the first lens 210 may have a concave shape, and the object surface S21 of the second lens 220 may have a convex shape, the object surface S31 of the third lens 230 may have a concave shape, and the object surface S41 of the fourth lens 240 may have a concave shape.

The image surfaces of the lenses have the following shapes. The central area of the image surface S12 of the first lens 210 may have a concave shape, and the image surface S22 of the second lens 420 may have a convex shape. The image surface S32 of the third lens 430 may have a concave shape, and the image surface S42 of the fourth lens 440 may have a concave shape.

Here, the shapes of the object surface and the image surface of each lens are the shapes in the vicinity of the optical axis. When the object surface and the image surface of each lens have an inflection point, areas of the object surface and the image surface far from the optical axis may have a shape different from the aforementioned shapes.

In the imaging lens according to the embodiments, the first lens 210 and the fourth lens 240 may have negative refractive power, and the second lens 220 and the third lens 230 may have positive refractive power.

The sum of the radius of curvature R1 of a first surface of the first lens 210 facing the object side, namely, the object surface S11, and the radius of curvature R2 of a second surface facing the image side, namely, the image surface S12, may be greater than −40.0 and less than −20.0.

The first lens 210 is concave on the object side and at least one of the object surface S11 facing the object side and the image surface S12 facing the image side may be an aspherical surface.

The second lens 220 may be convex to the object side and at least one of the object surface S21 facing the object side and the image surface S22 facing the image side may be an aspherical surface.

The third lens 230 may be convex to the object side and the image side, and the fourth lens 240 may be concave to the object side and the image side. At least one of the object surface S41 and the image surface S42 may be an aspherical surface.

The refractive index n3 of the third lens 230 may be greater than 1.61 and less than 1.63, and the Abbe number v3 thereof may be greater than 57 and less than 63.

The refractive index n4 of the fourth lens 240 may be greater than 1.63 and less than 1.65, and the Abbe number v4 thereof may be greater than 20 and less than 24.

Table 7 below shows the radiuses of curvature, the thicknesses and distances, the refractive indexes and the Abbe numbers of the objective surface and the image surface of each of the first lens 210 to the fourth lens 240 according to the fourth embodiment of the imaging lens.

A large radius of curvature corresponds to a case where the surface on the object side is concave or convex, only the absolute value thereof is taken into consideration without consideration of the sign value (− or +) of the radius of curvature.

The focal length f of the entire imaging lens in Table 7 may be f=3.17 mm, wherein the focal length f1 of the first lens 210 may be −5.10 mm, the focal length f2 of the second lens 220 may be equal to 8.697 mm, the focal length f3 of the third lens 230 may be 4.207 mm, and the focal length f4 of the fourth lens 240 may be −5.899 mm.

TABLE 7

| | Radius of curvature | Thickness or distance | Refractive index | Abbe number | Remarks |
|---|---|---|---|---|---|
| S11 | −36.194 | 1.319 | 1.5311 | 56 | Aspherical |
| S12 | 2.965 | 6.051 | | | Aspherical |
| S21 | 16.364 | 2.8 | 1.5311 | 56 | Aspherical |
| S22 | −6.053 | 0 | | | Aspherical |
| AP | | 3.090 | | | |
| S31 | 4.77 | 2.15 | 1.6204 | 60.3 | |
| S32 | −4.77 | 0.05 | | | |
| S41 | −5.323 | 0.46 | 1.642 | 22.4 | Aspherical |
| S42 | 13.570 | 0.973 | | | Aspherical |

Figure 8:
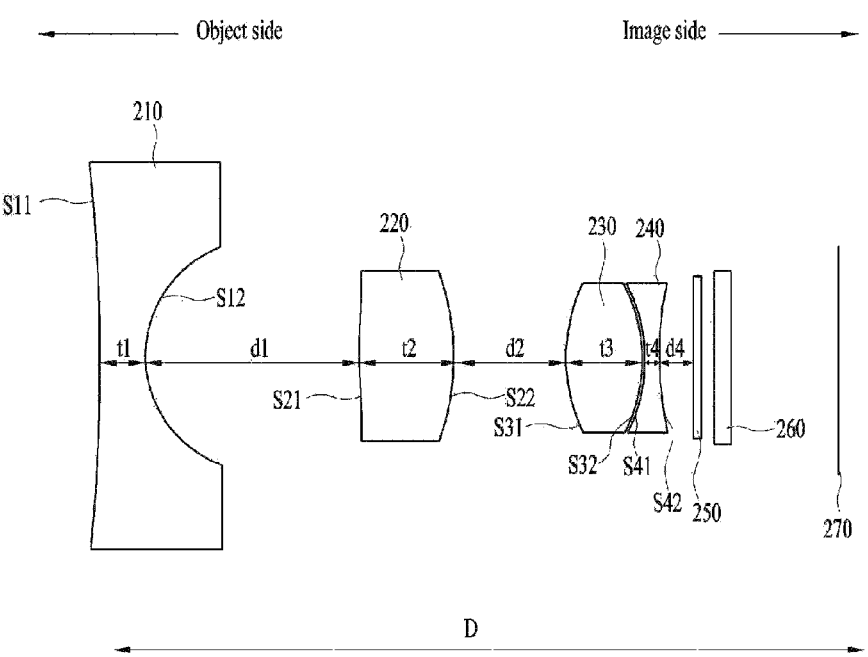
FIG. 8 illustrates the thicknesses and the separation distances of the respective lenses in the imaging lens of FIG. 7.

FIG. 8 illustrates the thicknesses and the separation distances of the respective lenses in the imaging lens of FIG. 7.

In FIG. 8 and Table 7, the thickness t1 of the first lens 210 is 1.3 mm, the thickness t2 of the second lens 220 is 2.8 mm, the thickness t3 of the third lens 230 is 2.15 mm, and the thickness t4 of the fourth lens 240 is 0.46 mm.

On the optical axis, the distance d1 between the first lens 210 and the second lens 220 on the optical axis is 6.051 mm and the distance d2 between the second lens 220 and the third lens 230 is 3.090 mm. Although not shown, the distance between the third lens 230 and the fourth lens 240 may be 0.05 mm and the distance d4 between the fourth lens 230 and the filter 250 may be 0.973 mm. The shorter the distance d4 between the AP and the third lens 230 or the fourth lens 240, the better the resolution of the imaging lens may be.

Table 8 below shows the conic constant k and aspherical coefficients A to D of each lens surface in the fourth embodiment of the imaging lens.

TABLE 8

| | S11 | S12 | S21 | S22 | S41 | S42 |
|---|---|---|---|---|---|---|
| K | −38.998765 | −0.0493508 | −40.792050 | −0.225426 | −2.524008 | −4.948423 |
| A | 0.212466E−03 | 0.813849E−03 | −0.126510E−02 | −0.192012E−02 | −0.412303E−02 | 0.300605E−02 |
| B | −0.398223E−05 | 0.227856E−03 | −0.408383E−03 | −0.779158E−04 | 0.315975E−03 | 0.270693E−03 |
| C | 0.197458E−07 | −0.203029E−04 | 0.476455E−04 | 0.115687E−04 | −0.886968E−04 | −0.389737E−04 |
| D | −0.706309E−11 | 0.235975E−05 | −0.445578E−05 | −0.126901E−05 | 0.799198E−05 | 0.264498E−05 |

Table 9 below shows the radiuses of curvature, the thicknesses and distances, the refractive indexes and the Abbe numbers of the objective surface and the image surface of each of the first lens 210 to the fourth lens 240 according to a fifth embodiment of the imaging lens.

TABLE 9

| | Radius of curvature | Thickness or distance | Refractive index | Abbe number | Remarks |
|---|---|---|---|---|---|
| S11 | −26.69 | 0.750 | 1.5311 | 56 | Aspherical |
| S12 | 3.0825 | 5.993 | | | Aspherical |
| S21 | 9.096 | 4.029 | 1.5311 | 56 | Aspherical |
| S22 | −7.406 | 0 | | | Aspherical |
| AP | | 2.86 | | | |
| S31 | 4.77 | 1.84 | 1.6204 | 60.3 | |
| S32 | −4.77 | 0.05 | | | |
| S41 | −4.897 | 0.460 | 1.642 | 22.4 | Aspherical |
| S42 | 17.37 | 0.906 | | | Aspherical |

Here, the focal length f of the entire imaging lens in Table 9 may be 3.169 mm, wherein the focal length f1 of the first lens 210 may be −5.158 mm, the focal length f2 of the second lens 22 may be 8.398 mm, the focal length f3 of the third lens 230 may be 4.151 mm, and the focal length f4 of the fourth lens 240 may be −5.903 mm.

Table 10 below shows the conic constant k and aspherical coefficients A to D of each lens surface in the fifth embodiment of the imaging lens.

TABLE 10

| | S11 | S12 | S21 | S22 | S41 | S42 |
|---|---|---|---|---|---|---|
| K | −16.579379 | −0.288786 | −4.7878450 | 0.458052 | −0.579987 | −32.227894 |
| A | 0.487033E−03 | 0.126222E−03 | −0.684325E−03 | −0.101929E−02 | −0.269175E−02 | 0.237005E−02 |
| B | −0.110966E−04 | 0.184202E−04 | −0.138781E−03 | −0.282426E−04 | 0.465361E−03 | 0.432981E−03 |
| C | 0.159277E−06 | −0.153081E−05 | 0.119430E−04 | 0.917149E−05 | −0.646831E−04 | −0.388406E−04 |
| D | −0.126956E−08 | 0.390832E−06 | −0.697457E−06 | −0.615933E−06 | 0.288411E−05 | 0.977621E−06 |

Table 11 below shows the radiuses of curvature, the thicknesses and distances, the refractive indexes and the Abbe numbers of the objective surface and the image surface of each of the first lens 210 to the fourth lens 240 according to a sixth embodiment of the imaging lens.

TABLE 11

|     | Radius of curvature | Thickness or distance | Refractive index | Abbe number | Remarks |
| --- | --- | --- | --- | --- | --- |
| S11 | −26.942 | 0.83 | 1.5311 | 56 | Aspherical |
| S12 | 3.183 | 6.51 | | | Aspherical |
| S21 | 8.944 | 3.36 | 1.5311 | 56 | Aspherical |
| S22 | −7.859 | 0 | | | Aspherical |
| AP  |         | 2.935 | | | |
| S31 | 4.77 | 1.84 | 1.6204 | 60.3 | |
| S32 | −4.77 | 0.05 | | | |
| S41 | −4.967 | 0.46 | 1.642 | 22.4 | Aspherical |
| S42 | 15.884 | 0.9 | | | Aspherical |

Here, the focal length f of the entire imaging lens in Table 11 may be 3.168 mm, wherein the focal length f1 of the first lens 210 may be −5.308 mm, the focal length f2 of the second lens 22 may be 8.462 mm, the focal length f3 of the third lens 230 may be 4.150 mm, and the focal length f4 of the fourth lens 240 may be −5.843 mm.

Table 12 below shows the conic constant k and aspherical coefficients A to D of each lens surface in the sixth embodiment of the imaging lens.

TABLE 12

|   | S11 | S12 | S21 | S22 | S41 | S42 |
| --- | --- | --- | --- | --- | --- | --- |
| K | −20.000000 | −0.251381 | −3.573888 | 0.882868 | 0.345185 | −50.000000 |
| A | 0.461869E−03 | 0.162653E−03 | −0.946475E−03 | −0.123154E−02 | −0.220773E−02 | 0.318388E−02 |
| B | −0.110454E−04 | 0.262291E−04 | −0.198982E−03 | −0.490678E−04 | 0.528154E−03 | 0.225406E−03 |
| C | 0.170872E−06 | −0.268774E−05 | 0.228271E−04 | 0.121194E−04 | −0.737195E−04 | −0.725676E−04 |
| D | −0.134801E−08 | 0.329714E−06 | −0.159624E−05 | −0.923869E−06 | 0.474332E−05 | 0.529929E−06 |

In order to correct the chromatic aberration, lenses may be formed of plastics, and one lens may be formed of glass. In embodiments, the third lens 230 or the fourth lens 240 may be formed of glass.

In particular, the refractive indexes of the first lens 210 and the second lens 220 may be greater than or equal to 1.5, and the Abbe number thereof may be greater than or equal to 50.

When the lenses are formed in a glass mold, it is necessary to set the press temperature for lens formation to be high since a relatively high transition point is obtained. As a result, the mold is likely to be deformed, the manufacturing cost may be increased due to an increase in the number of times of replacement of the mold. Forming the lens of plastics may facilitate may be advantageous in obtaining an aspherical lens and manufacturing a small lens.

Although not shown, coating may be applied to the surfaces of each lens to prevent reflection or improve surface hardness.

Figure 9A:
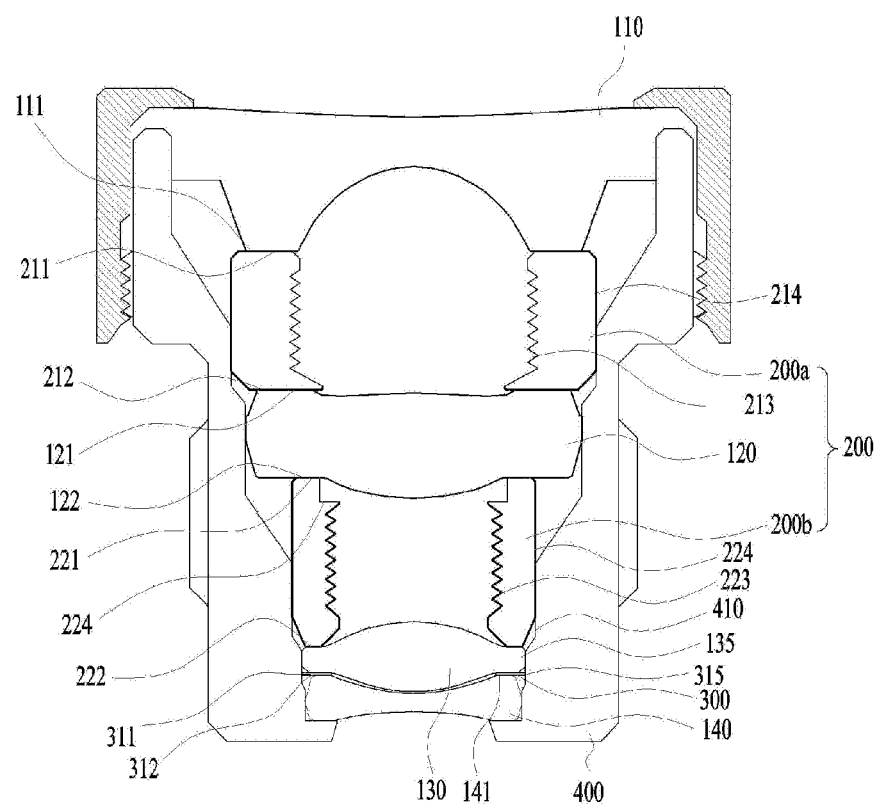
FIGS. 9A and 9B illustrate a seventh embodiment of the imaging lens.
Figure 9B:
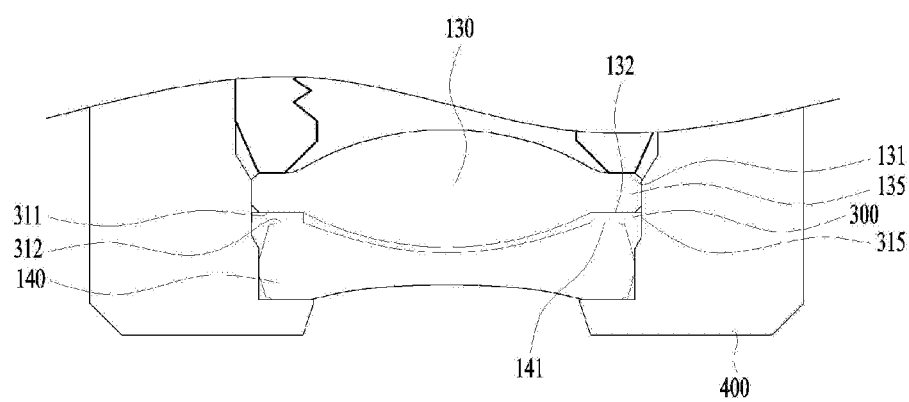

FIGS. 9A and 9B illustrate a seventh embodiment of the imaging lens.

Referring to FIGS. 9A and 9B, the imaging lens according to the seventh embodiment may include a plurality of lenses 100 to 140 sequentially arranged in a lens barrel 400 and a gap maintaining member 200 disposed between the plurality of lenses.

The plurality of lenses 100 to 140 may be arranged sequentially from the object side to the image side, and may include a first lens to an n-th lens, where n may be an integer greater than or equal to 2.

In order to implement a wide angle lens, the object surface of the first lens 110 may be formed in a concave shape to collect light and have a negative refractive power. When the plurality of lenses 100 to 140 is arranged in the lens barrel 400, the object surface of the first lens 110 is exposed to the outside. The concave shape of the object surface of the first lens 110 may minimize impact from an external environment and attenuate occurrence of scratches.

In addition, the plurality of lenses may be arranged inside the lens barrel 400 in a vertical direction in a manner that the object surface of one lens faces the image surface of a neighboring lens.

The second lens 120 may be disposed such that the image surface of the first lens 110 faces the object surface of the second lens 120. The second lens 120 may have a positive refractive power. The third lens 130 may be formed of glass and have a positive refractive power, and the fourth lens 140 may be formed of plastics and have a negative refractive power.

In addition, a gap maintaining member 200 may be disposed between neighboring lenses to maintain a gap between neighboring lenses.

Here, the gap maintaining member 200 may have an outer circumferential surface 214, 224 that contacts the inner circumferential surface 410 of the lens barrel 400 and may be disposed between neighboring lenses to maintain the gap between the lenses. The gap maintaining member 200 may include a first coupling surface 211, 221 contacting the image surface of the (n−1)-th lens and a second coupling surface 212, 222 contacting the object surface of the n-th lens. The object surface and/or image surfaces of the first to fourth lenses 1110 to 140 may include at least one contact surface to be coupled with the coupling surface of the gap maintaining member, and at least one part of the contact surface may be a flat surface.

Further, the inner circumferential surface of the gap maintaining member 200 may be provided with a diffused reflection preventing portion 213, 223 capable of preventing diffused reflection of light diverging to the object surface of the n-th lens.

In an embodiment, the imaging lens may include first to fourth lenses 110 to 140, and a first gap maintaining member 200a may be disposed between the first lens 110 and the second lens 120. The first gap maintaining member 200a includes a first coupling surface 211 contacting the image surface of the first lens 110 and a second coupling surface 212 contacting the object surface of the second lens 120. The first coupling surface 211 and the second coupling surface 212 may be coupled to the first lens 110 and the second lens 120 to maintain the gap between the first coupling surface 211 and the second coupling surface 212.

The first diffused reflection preventing portion 213 may be formed on the inner circumferential surface of the first gap maintaining member 200a.

Here, the first diffused reflection preventing portion 213 may include a concave/convex portion, and the angle between the two surfaces of the convex portion of the concave/convex portion facing each other may be 50° to 70°.

The first and second coupling surfaces 211 and 212 of the first gap maintaining member 200a may make surface contact with the first contact surface 111 of the image surface of the first lens 110 and the second contact surface 121 of the object surface of the second lens 120, respectively. Here, the shapes or areas of the first coupling surface 211 and the second coupling surface 212 may be changed depending on the sizes of the first lens 110 and the second lens 120 or the shapes of the image surface of the first lens 110 and the object surface of the second lens 120.

That is, when the image surface of the first lens 110 is concave and the object surface of the second lens 120 is flat or concave as in the embodiment, the first and second coupling surfaces 211 and 212 may be formed to have an area wider than the areas of the first contact surface 111 and the second contact surface 121, respectively, and. the first gap maintaining member 200a may be disposed between the first lens 110 and the second lens 120.

Here, a plurality of lenses may be disposed such that the diameter of the first lens 110 is greater than that of the second lens 120. In particular, when the diameter of the second lens 120 is set to be greater than the diameters of the other lenses to implement a wide angle, the aforementioned structure may more stably maintain the gap between the first lens 110 and the second lens 120.

Meanwhile, a second gap maintaining member 200b may be disposed between the second lens 120 and the third lens 130. The second gap maintaining member 200b may maintain the gap between the second lens 120 and the third lens 130 as the first coupling surface 221 contacting the image surface of the second lens 120 and the second coupling surface 222 contacting the object surface of the third lens 130 are coupled to the second lens 120 and the third lens 130, respectively.

In addition, a second diffused reflection preventing portion 223 may be formed on the inner circumferential surface of the second gap maintaining member 200b.

Here, the third diffused reflection preventing portion 223 may include a concave/convex portion, and the angle between the two surfaces of the convex portion of the concave/convex portion facing each other may be 50° to 70°.

The first coupling surface 221 of the second gap maintaining member 200b may be provided with a step 224. The step 224 may be formed to have a predetermined height from the image surface of the second lens 120 and to secure a space in which the central portion of the lens 120 is disposed.

In addition, the lower surface of the step 224 may serve as an aperture capable of adjusting the amount of light transmitted through the second lens 120 and incident on the third lens 130.

Here, in order to secure a space in which the central portion of the image surface of the second lens 120 having a convex shape is disposed and secure a path through which light transmitted through the second lens 120 via the aperture disposed in the second gap maintaining member 200b is incident on the third lens 130, the lenses may be arranged such that the largest gap is formed between the second lens 120 the third lens 130.

In addition, a third gap maintaining member 300 may be disposed between neighboring lenses.

The third gap maintaining member 300 may have an outer circumferential surface 315 contacting the inner circumferential surface of the lens barrel 400 and be disposed between the third lens 130 and the fourth lens 140 to maintain the gap between the lenses. The third gap maintaining member 300 may also include a first coupling surface 311 contacting the image surface of the third lens 130 and a second coupling surface 312 contacting the object surface of the fourth lens.

Here, the first coupling surface 311 to be coupled to the fourth lens 140 may be formed as a flat surface, and thus the third gap maintaining member 300 may make surface contact with the edge portions of the image surface of the third lens and the object surface of the fourth lens. For example, the edge portion of the image surface of the third lens 130 may be provided with a coupling flange 135, which contacts the first coupling surface 311.

Specifically, the coupling flange 135 may be formed on the edge portion of the third lens 130 in a direction perpendicular to the direction in which the plurality of lenses is stacked. In addition, the upper surface of the coupling flange 135 may be provided with a first contact surface 131 coupled to the second coupling surface 222 of the second gap maintaining member 200b, and the lower surface of the coupling flange 135 may be provided with a second contact surface 132 coupled to the coupling surface 311 of the third gap maintaining member 300. The third gap maintaining member 300 may be disposed between the coupling flange 135 and a first contact surface 141 formed on the edge portion of the fourth lens 140 in parallel with the coupling flange 135. The third gap maintaining member 300 is disposed in the shape of a ring having flat upper and lower surfaces. Thereby, the second contact surface 132 of the third lens 130 contacting the third gap maintaining member 300 may be arranged in parallel with the first contact surface 141 of the fourth lens 140.

In conventional cases, one surface of the third lens is convex, and when a gap maintaining member is disposed between the third lens and the fourth lens having a concave surface corresponding to the one surface of the third lens, a groove is formed at the edge of the fourth lens to arrange the gap maintaining member corresponding to the shape of the groove to maintain the gap between the third lens and the fourth lens.

With this structure, the edge of the gap maintaining member disposed in the groove contacts the convex surface of the third lens and thus the third lens may be damaged. Further, an injection process for forming a groove in the fourth lens is required to dispose the gap maintaining member, and thus the production yield of the imaging lens may be deteriorated.

The imaging lens described above may be applied to a camera module including a filter allowing light passed through the imaging lens to be selectively transmitted according to the wavelength and a light receiving element for receiving light transmitted through the filter.

The camera module including the imaging lens described above may be built in various digital devices such as a digital camera, a smart phone, a notebook, and a tablet PC. In particular, it may be embedded in a digital device capable of capturing an image by realizing a wide angle, thereby minimizing distortion of the captured image.

While the present disclosure has been particularly shown and described with reference to embodiments thereof, it is to be understood that the present disclosure is not limited to the disclosed embodiments, but, on the contrary, it will be understood that various modifications and applications are possible within the scope of the present disclosure. For example, each component specifically shown in the embodiments may be modified and implemented. It is to be understood that all changes and modifications that come within the meaning and range of equivalency of the claims are therefore intended to be embraced therein.

MODE FOR INVENTION

The mode for carrying out the invention has been fully described above in the "Best Mode".

INDUSTRIAL APPLICABILITY

An imaging lens according to embodiments and a camera module having the same may prevent the surfaces of the lenses from being contaminated by foreign matter while preventing scratches on the surfaces and may also realize a low distortion image with a wide angle of view.

The invention claimed is:

1. An imaging lens comprising:
a first lens to a fourth lens sequentially arranged from an object side to an image side;
an aperture stop disposed between the second lens and the third lens; and
a gap maintaining member disposed between neighboring lenses of the first to third lenses to maintain a gap between the neighboring lenses,
wherein an inner circumferential surface of the gap maintaining member is provided with a diffused reflection preventing portion including a concave/convex portion,
wherein the second lens is disposed closer to the aperture stop than is the third lens,
wherein the first lens has a negative refractive power, the second lens and the third lens have a positive refractive power, and the fourth lens has a negative refractive power,
the imaging lens satisfying Equation 1:

$$-40.0 < R1 + R2 < -20.0,\qquad \text{<Equation 1>}$$

where R1 is a radius of curvature of an object surface of the first lens, and R2 is a radius of curvature of an image surface of the first lens,
wherein at least one of the first lens to the fourth lens is formed of glass, and
wherein an image surface of the third lens is convex, an object surface of the fourth lens is concave, and a first distance between the image surface of the third lens and the object surface of the fourth lens is 40 μm to 60 μm.

2. The imaging lens according to claim 1, wherein the third lens has a refractive index greater than 1.57 and less than 1.60.

3. The imaging lens according to claim 1, wherein an Abbe number of the third lens is greater than 60 and less than 64.

4. The imaging lens according to claim 1, wherein an object surface of the third lens has a conic constant greater than −0.10 and less than 0.21,
wherein the image surface of the third lens has a conic constant greater than −1.4 and less than −0.7.

5. The imaging lens according to claim 1, wherein the third lens has a refractive index greater than 1.61 and less than 1.63.

6. The imaging lens according to claim 1, wherein the third lens has an Abbe number greater than 57 and less than 63.

7. The imaging lens according to claim 1, wherein the fourth lens has a refractive index greater than 1.63 and less than 1.65.

8. The imaging lens according to claim 1, wherein the fourth lens has an Abbe number greater than 20 and less than 24.

9. The imaging lens according to claim 1, wherein the first lens is concave to the object side, and at least one of the object surface of the first lens and the image surface of the first lens is an aspherical surface.

10. The imaging lens according to claim 1, wherein the second lens is convex to the object side, and at least one of an object surface of the second lens and an image surface of the second lens is an aspherical surface.

11. The imaging lens according to claim 1, wherein the fourth lens is concave to the object side and the image side, and at least one of the object surface of the fourth lens and an image surface of the fourth lens is an aspherical surface.

12. An imaging lens comprising:
a first lens to a fourth lens sequentially arranged from an object side to an image side, wherein:
the first lens has a concave object surface and has a negative refractive power,
the second lens has a positive refractive power,
the third lens is formed of glass and has a positive refractive power, and
the fourth lens is made of plastic and has a negative refractive power;
a gap maintaining member disposed between neighboring lenses of the lenses to maintain a gap between neighboring lenses; and
an aperture stop disposed between the second lens and the third lens,
wherein an inner circumferential surface of the gap maintaining member is provided with a diffused reflection preventing portion including a concave/convex portion,
wherein the second lens is disposed closer to the aperture stop than the third lens,
wherein the gap maintaining member comprises a coupling surface including a flat surface, the coupling surface being coupled to an object surface and an image surface of the neighboring lenses, and
wherein an image surface of the third lens is convex, an object surface of the fourth lens is concave, and a first distance between the image surface of the third lens and the object surface of the fourth lens is 40 μm to 60 μm.

13. The imaging lens according to claim 12, wherein the object surface and/or the image surface of each of the first lens to the fourth lens comprises at least one contact surface to be coupled to the coupling surface of the gap maintaining member, at least one part of the contact surface being a flat surface.

14. The imaging lens according to claim 12, wherein a gap between the second lens and the third lens is the largest among gaps between the neighboring lenses.

15. The imaging lens according to claim 12, wherein a diameter of the first lens is greater than a diameter of the second lens, and the diameter of the second lens is greater than a diameter of the third lens.

16. A camera module comprising:
an imaging lens comprising a first lens to a fourth lens sequentially arranged from an object side to an image side, wherein the first lens has a negative refractive power, the second lens and the third lens have a positive refractive power, and the fourth lens has a negative refractive power;
a filter allowing light passed through the imaging lens to be selectively transmitted therethrough according to a wavelength, the filter being disposed to the image side of the fourth lens; and a light receiving element configured to receive the light transmitted through the filter, the light receiving element being disposed to the image side of the filter, wherein the imaging lens comprises exactly four lenses such that no additional lens is present between the fourth lens and the filter, wherein the imaging lens comprises an aperture stop disposed between the second lens and the third lens, and wherein the second lens is disposed closer to the aperture stop than is the third lens, wherein the imaging lens comprises a gap maintaining member disposed between neighboring lenses of the first to third lenses to maintain a gap between the neighboring lenses, wherein an inner circumferential surface of the gap maintaining member is provided with a diffused reflection preventing portion including a concave/convex portion, and wherein an image surface of the third lens is convex, an object surface of the fourth lens is concave, and a first distance between the image surface of the third lens and the object surface of the fourth lens is 40 µm to 60 µm.

17. The imaging lens according to claim 12, wherein the third lens has a refractive index greater than 1.57 and less than 1.60, an Abbe number of the third lens is greater than 60 and less than 64, an object surface of the third lens has a conic constant greater than −0.10 and less than 0.21, and wherein the image surface of the third lens has a conic constant greater than −1.4 and less than −0.7.

18. The imaging lens according to claim 1, wherein a second distance between an image surface of the second lens and the aperture stop is 0.46 mm, and wherein a third distance between an object surface of the third lens and the aperture stop is 2.63 mm.

19. The imaging lens according to claim 1, wherein the first distance is 0.05 mm.

20. The imaging lens according to claim 1, wherein a radius of curvature of an object surface of the second lens is in a range of from 8.944 mm to 16.365 mm.

21. The camera module according to claim 16, wherein a radius of curvature of an object surface of the second lens is in a range of from 8.944 mm to 16.365 mm, and wherein a second distance between the image surface of the fourth lens and the filter is in a range of from 0.879 mm to 0.984 mm.

* * * * *